United States Patent [19]
Horgan

[11] 3,958,140
[45] May 18, 1976

[54] GENERATOR CONTAINMENT SYSTEM

[75] Inventor: John J. Horgan, Wethersfield, Conn.

[73] Assignee: United Technologies Corporation, Hartford, Conn.

[22] Filed: Dec. 19, 1974

[21] Appl. No.: 534,315

[52] U.S. Cl. .................................... 310/89; 310/91
[51] Int. Cl.² ........................................ H02K 5/24
[58] Field of Search .................. 248/23, 16; 310/51, 310/89, 85, 91, 216, 218, 254, 258, 259

[56] References Cited

UNITED STATES PATENTS 2,754,441 7/1956 Morgan .............................. 310/258
3,805,102 4/1974 Vöckler .............................. 310/91

*Primary Examiner*—Donovan F. Duggan
*Attorney, Agent, or Firm*—Charles A. Warren

[57] ABSTRACT

In a generator containment system, a stator member is enclosed within and turnable in a surrounding outer member, with an energy absorbing structure interconnecting the members so that, in the event of a burst or seized rotor, journaled within said members, the torque imparted to the surrounding rotor will be absorbed during a short turning motion of the stator member, thereby avoiding otherwise catastrophic failure.

6 Claims, 2 Drawing Figures

6
24
30
10
2
2
34
20
2
12
38
14
36
8
26
28
4
22
18
16

12
34
14

36
38
40

GENERATOR CONTAINMENT SYSTEM

SUMMARY OF THE INVENTION

In generator constructions, failures due to a seized or burst rotor in which the rotor impacts the stator so as to be stopped immediately, the generator stator and case may be torn loose from its supports with catastrophic results. This is true whether the generator is on a vertical or horizontal axis. Although such failures are disastrous in any event, such failures are particularly serious in nuclear power plants where absolute protection against disaster must be provided.

According to the present invention, the possibility of a rotor failure that may cause sudden stopping of the rotor within the case is anticipated by supporting the generator stator within a surrounding case by energy absorbing structures that will permit a limited amount of turning of the stator within the case but with such damping provided as to absorb the rotational energy imparted to the stator when the rotor fails. This arrangement provides that the outer case will remain on its supports and contain the failed rotor.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
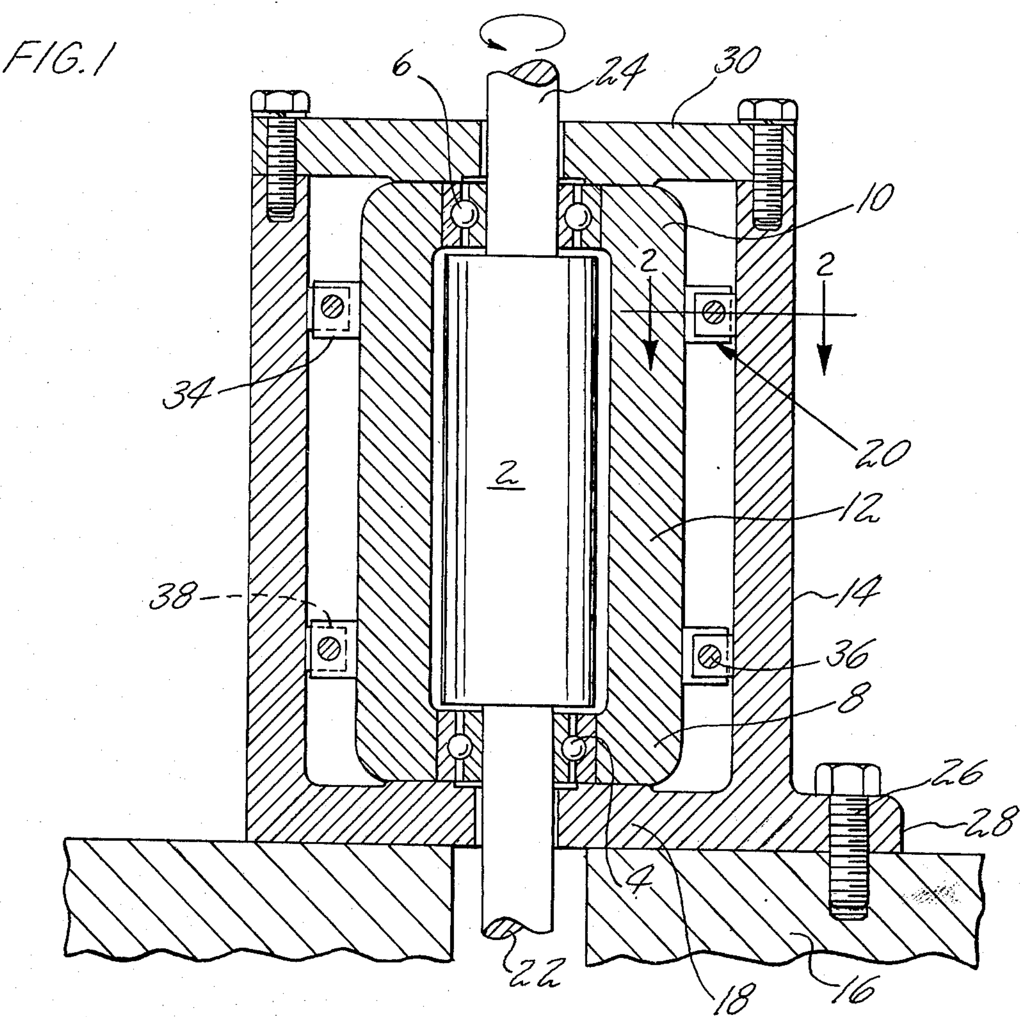
FIG. 1 is a sectional view through a generator embodying the invention.

In the arrangement shown, the generator includes a rotor 2 journaled in bearings 4 and 6 in end pieces 8 and 10 on the ends of the stator 12 that surrounds the rotor. The stator 12 is supported within an outer case 14 which surrounds the stator and rotor and rests on a supporting structure 16. The case 14 may have an internal flange 18 at its bottom end to support the stator endwise and the stator is supported concentrically to the outer case by energy absorbing structures 20 that normally hold the stator in fixed position within the outer case. The rotor may have a projecting shaft 22 at the bottom end through which the rotor is driven and may have a projecting end 24 at the top for controls if desired. The outer case is securely attached to the supporting structure, this attachment being shown by way of example as bolts 26 through a mounting flange 28 on the outer case.

As above stated, the stator is turnable within the outer case. For example, the stator rests on the flange 18 and is slidable thereon, and is guided at the top by another similar flange or cap 30, essentially a part of the case. Should the rotor seize or burst, thereby imparting a severe high torque to the stator, the latter is permitted to turn to a limited extent within the outer case with adequate damping provided by the devices 20 to absorb the energy of the rotor without tearing the outer case from its mountings.

Figure 2:
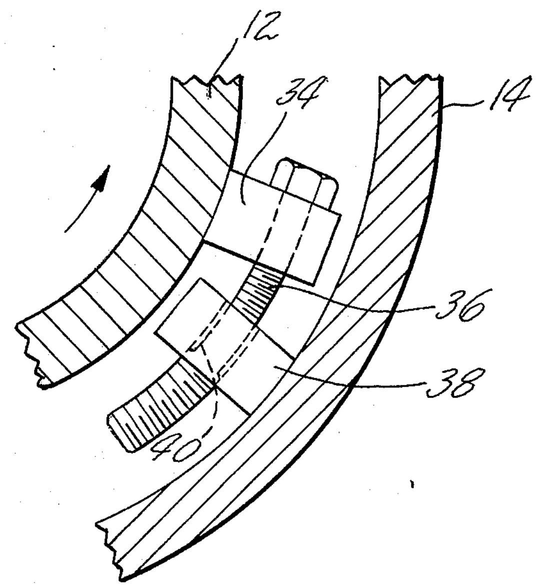
FIG. 2 is a fragmentary sectional view of a form of energy absorbing device.

This damping action, or energy absorption is accomplished by a mechanism that permits this limited turning movement of the stator with the energy absorption devices effective to reduce the forces transmitted to the outer case to such a level that they will not affect the stability of the outer case on its supporting structure. One example of an energy absorbing structure is shown in FIG. 2 in which the stator member 12 has a projecting lug 34 carrying a bolt 36 that extends substantially tangentially of both the stator member and the outer case member. The outer case member 14 carries a cooperating lug 38 having a die 40 therein to receive the bolt and so constructed that as the lugs are moved apart by a turning of the stator within the outer case the bolt is extruded through the die and energy is thus absorbed. Such a device extends the time over which the forces are transmitted from the stator to the outer case and thus reduces the forces to a level that allows an economical and stable structure. Although the drawing shows only four of these devices it will be understood that any necessary number are utilized to absorb the energy forces within the permissible turning of the stator.

Although the device is described with respect to a vertical generator it will be understood that it is equally usable on horizontal-axis generators. It is particularly useful in nuclear power plants where absolute protection against catastrophic failures is a requirement. The arrangement is such that a failed rotor, that might otherwise result in tearing loose the entire generator, will, by these energy absorbing devices, be contained and the generator assembly will remain in position in the power plant.

Although the invention has been shown and described with respect to a preferred embodiment thereof, it sould be understood by those skilled in the art that other various changes and omissions in the form and detail thereof may be made therein without departing from the spirit and the scope of the invention.

Having thus described a typical embodiment of my invention that which I claim as new and desire to secure by Letters Patent of the United States is:

1. In a containment system for a generator, the latter including a stator and a rotor within and journaled in the stator, the system including:

a surrounding case around at least a part of said stator and within which the stator and rotor are positioned and in which the stator is turnable, and energy absorbing structures spaced around the stator and positioned between said stator and case to hold the stator in position within the case under normal loads, said structures being so oriented to permit angular movement of the stator to a limited extent in the same direction as the normal rotation of the rotor only under severe high torque above normal loadings.

2. A containment system as in claim 1 in which each energy absorbing structure includes a bolt extending substantially tangentially between said case member and stator member and a die on one of said members through which said bolt is extrudable.

3. A containment system as in claim 1 in which each of the structures include cooperating elements on the case and stator and an extrudable member extending substantially tangentially of said case and stator and connecting said elements.

4. The combination with a generator rotor and a surrounding stator member, of an outer case member enclosing said rotor and stator member, said rotor being journaled in one of said members, and energy absorbing structures interconnecting said stator member and said outer case member and normally supporting said members against relative rotation, said structures being arranged to permit angular turning movement of said stator within said outer case member under excessive torque loads above the normal torque on the stator, and to absorb energy to limit the extent of the turning movement.

5. The combination of claim 4 in which the structures include at least one bolt arranged tangentially between said members and attached to one of them, and a die on the other of said members to receive said bolt and through which the bolt is extrudable.

6. The combination of claim 4 in which the structures include cooperating elements on the members and an extrudable member extending substantially tangentially of said members and interconnecting said elements.

* * * * *